(12) United States Patent
Tanaya et al.

(10) Patent No.: US 8,860,419 B2
(45) Date of Patent: Oct. 14, 2014

(54) ION CURRENT DETECTOR

(75) Inventors: Kimihiko Tanaya, Chiyoda-ku (JP);
Hiroshi Okuda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 444 days.

(21) Appl. No.: 13/226,668

(22) Filed: Sep. 7, 2011

(65) Prior Publication Data
US 2012/0286791 A1  Nov. 15, 2012

(30) Foreign Application Priority Data
May 13, 2011   (JP) .................................. 2011-108184

(51) Int. Cl.
*F02P 17/00*   (2006.01)
*F02D 41/22*   (2006.01)
*F02D 35/02*   (2006.01)

(52) U.S. Cl.
CPC ............... *F02D 41/222* (2013.01); *Y02T 10/40* (2013.01); *F02D 35/021* (2013.01)
USPC ........................................................ 324/393

(58) Field of Classification Search
CPC ...... F02D 35/021; F02D 41/222; Y02T 10/46
USPC ........................................................ 324/393
See application file for complete search history.

(56) References Cited

U.S. PATENT DOCUMENTS

| | | | |
|---|---|---|---|
| 5,781,012 A * | 7/1998 | Yasuda | 324/399 |
| 6,054,859 A * | 4/2000 | Takahashi et al. | 324/399 |
| 6,118,276 A * | 9/2000 | Nakata et al. | 324/464 |
| 6,202,474 B1 * | 3/2001 | Takahashi et al. | 73/35.08 |
| 6,216,530 B1 * | 4/2001 | Shimizu et al. | 73/114.08 |
| 6,222,368 B1 * | 4/2001 | Inagaki et al. | 324/399 |
| 2002/0145429 A1 * | 10/2002 | Yorita et al. | 324/380 |
| 2003/0196481 A1 * | 10/2003 | Okamura et al. | 73/118.1 |
| 2005/0066948 A1 * | 3/2005 | Umino et al. | 123/597 |
| 2009/0084369 A1 * | 4/2009 | Idogawa et al. | 123/634 |
| 2011/0017172 A1 * | 1/2011 | Shigenaga et al. | 123/406.26 |
| 2011/0210745 A1 * | 9/2011 | Barrett | 324/388 |

FOREIGN PATENT DOCUMENTS

| | | |
|---|---|---|
| JP | 08-338298 A | 12/1996 |
| JP | 2000-045924 A | 2/2000 |
| JP | 2005-048649 A | 2/2005 |

OTHER PUBLICATIONS

Japanese Office Action dated May 8, 2012 for corresponding JP 2011-108184.

* cited by examiner

*Primary Examiner* — Patrick Assouad
*Assistant Examiner* — Demetrius Pretlow
(74) *Attorney, Agent, or Firm* — Sughrue Mion, PLLC; Richard C. Turner

(57) ABSTRACT

In order not to deteriorate the detection properties of an ion current that monitors a combustion state even when a smolder leak is present in an ignition plug of an internal combustion engine, an ion current detector includes an ignition plug of an internal combustion engine, an ignition coil which supplies a high voltage to the ignition plug, a controller which sends an ignition command, a bias capacitor which supplies a bias voltage to the ignition coil, an ignition capacitor which is connected to a primary side winding of the ignition coil, a DC power supply which charges the ignition capacitor and the bias capacitor, a current detecting unit which detects a current flowing through the ignition plug, an ion current detecting unit which detects an ion current from the current detected by the current detecting unit, and a Zener diode which restricts a charging voltage of the bias capacitor.

8 Claims, 3 Drawing Sheets

ION CURRENT DETECTOR

BACKGROUND OF THE INVENTION

1. Field of the Invention

The present invention relates to an ion current detector which detects an ion, for example, generated by combustion in an internal combustion engine.

2. Description of the Related Art

In recent years, the problems of environmental conservation and fossil fuel depletion have been raised and it becomes an urgent need to deal with these problems also in the automotive industry. As an example dealing with this, there is ultra-lean combustion (stratified lean combustion) operation of an engine which utilizes a stratified fuel-air mixture. In the stratified lean combustion, the concentration of the fuel-air mixture may vary; and therefore, in the case of combustion in a locally rich state, soot is generated and carbon adheres to an ignition plug. Accordingly, a leak caused by a smolder is generated.

Under conditions where the smolder leak is generated, there is a high possibility that fails to ignite the fuel-air mixture; and from this standpoint, a technique for monitoring whether or not intended combustion is obtained is desired. As one of such methods, methods which detect an ion generated by the combustion as a current and monitor the combustion state from generation conditions of the ion current are proposed in large numbers.

As a device for detecting such ion current, for example, in an internal combustion engine ignition device disclosed in Patent Document 1, an ignition circuit of an ignition plug is configured so as to perform multiple discharge by so-called a capacitor discharge ignition (CDI) system which includes an ignition coil in which an ignition plug is connected to a secondary side winding L2, a capacitor which is connected in series to a primary side winding L1 of the ignition coil, a boosting circuit which charges the capacitor by boosting a voltage of a battery BT, a thyristor which intermits a closed-loop formed by the capacitor and the primary side winding L1, and a timer circuit which repeatedly outputs a trigger signal TG that makes the thyristor turn on at a constant discharging interval during the time defined by an ignition signal IG that is set depending on an operating state. The capacitor is charged by utilizing a secondary current flowing through the secondary side winding of the ignition coil and a voltage (bias voltage) across the ends of the charged capacitor is applied to a central electrode of the ignition plug via the secondary side winding of the ignition coil; and accordingly, an ion current that flows by an ion generated by combustion of a fuel-air mixture is detected to get a grasp of the combustion state.

[Patent Document 1] Japanese Unexamined Patent Publication No. 2000-45924

However, in the internal combustion engine ignition device of Patent Document 1, a method for charging a capacitor by utilizing the secondary current is adopted; and there are concerns that the capacitor cannot be sufficiently charged to a necessary voltage when capacitance of the capacitor is set to be large, and energy is consumed for charging the capacitor and therefore energy for spark discharge is reduced to deteriorate ignition properties to the fuel-air mixture. Therefore, a capacitor whose capacitance is relatively small is used for an actual device in consideration of such circumstances.

But, in the case where the smolder leak of the ignition plug is generated, the smolder leak being apt to generate in the stratified lean combustion, problems exist in that energy stored in the capacitor flows out as a leakage current from a path of the leak caused by the smolder and therefore a bias voltage for detecting an ion current is reduced to deteriorate the detection properties of the ion current, and the proportion of the amount of energy flow with respect to the capacitance of the capacitor increases and therefore the leakage current associated with the lowering of the bias voltage has a waveform shape that simply attenuates during one ignition cycle and it becomes difficult to discriminate between the ion current and the leakage current.

BRIEF SUMMARY OF THE INVENTION

The present invention has been made to solve the problem described above, and an object of the present invention is to provide an ion current detector which does not deteriorate the detection properties of an ion current that monitors a combustion state even when a leak caused by a smolder is present in an ignition plug of an internal combustion engine.

In order to solve the foregoing problem, an ion current detector of the present invention includes a bias capacitor which supplies a bias voltage to an ignition plug of an internal combustion engine, a direct current (DC) power supply which charges the bias capacitor, and an ion current detecting unit which detects an ion current included in a current flowing through the ignition plug.

According to the ion current detector of the present invention, the bias capacitor which supplies the bias voltage to the ignition plug is charged by the DC power supply, whereby there is an effect in that the detection properties of the ion current does not deteriorate even in the case where a path of a leakage current caused by a smolder or the like of the ignition plug is formed.

DETAILED DESCRIPTION OF THE INVENTION

Hereinafter, an ion current detector according to a preferred embodiment of the present invention will be described with reference to FIG. 1, FIG. 2, and FIGS. 3A to 3D.

Preferred Embodiment 1

Figure 1:
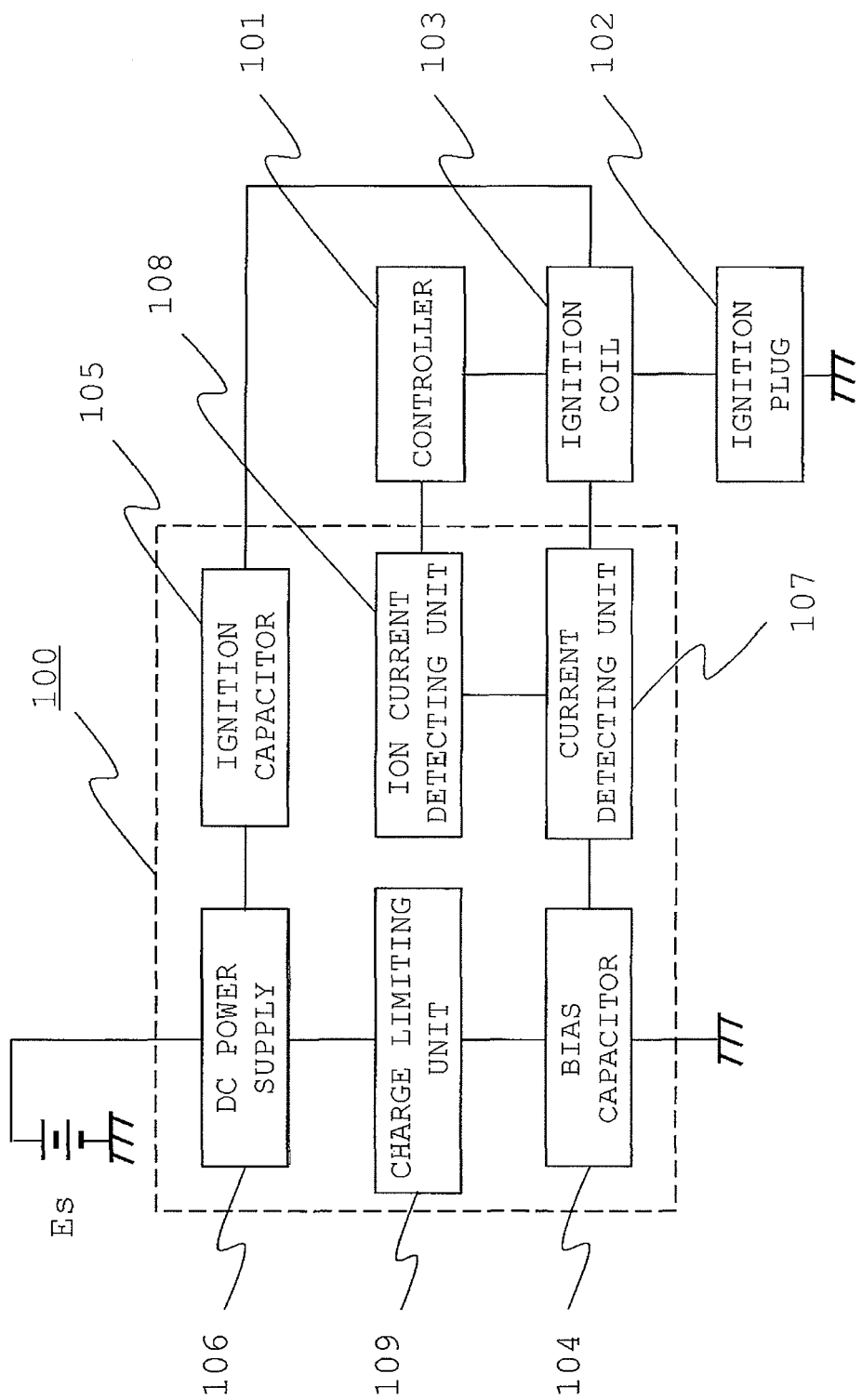
FIG. 1 is a block diagram showing the whole of an ignition system of an internal combustion engine including an ion current detector according to a preferred embodiment 1.
Figure 2:
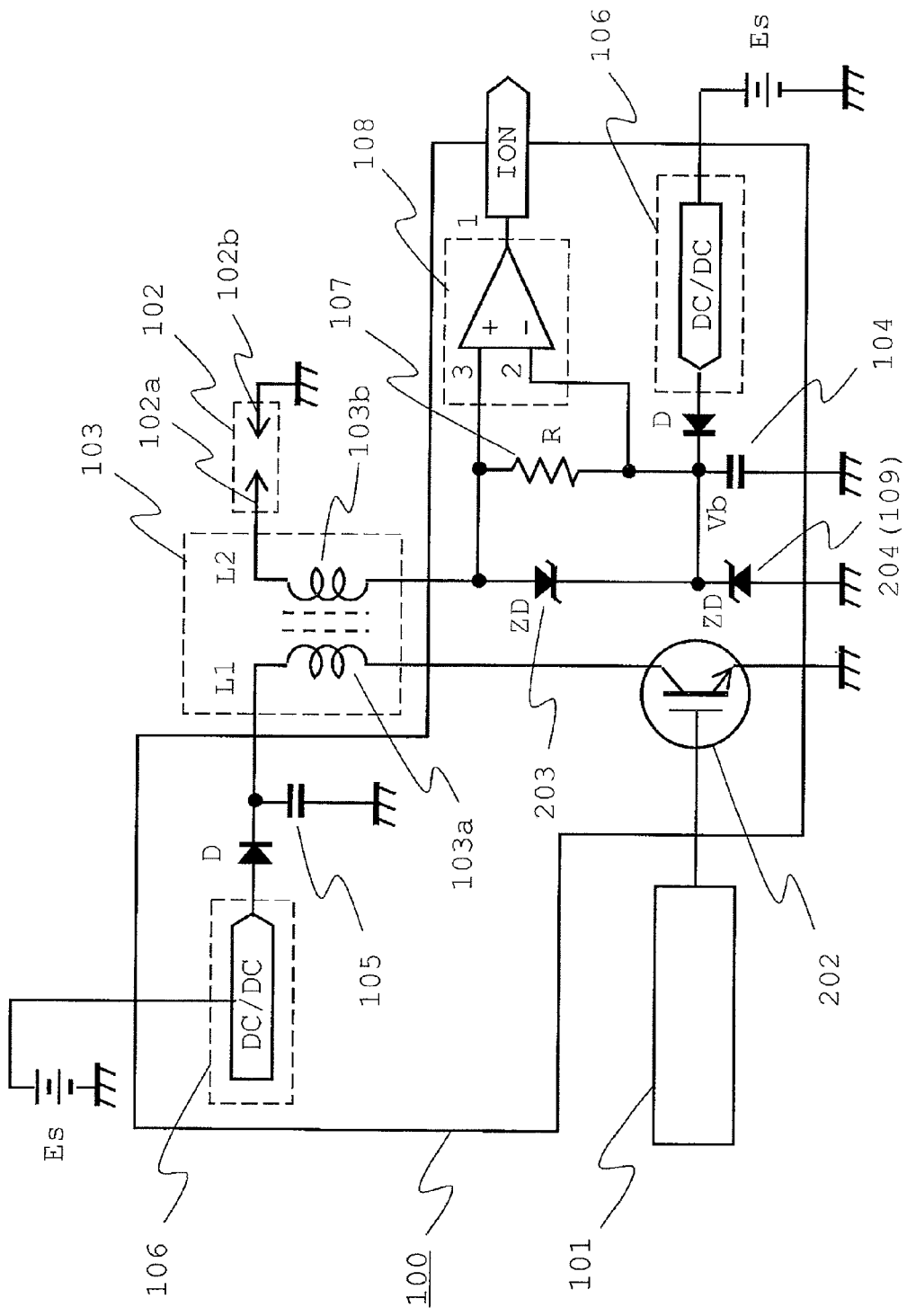
FIG. 2 is a circuit configuration diagram of the ion current detector according to the preferred embodiment 1.

FIG. 1 is a block diagram showing the whole of an ignition system of an internal combustion engine including an ion current detector according to a preferred embodiment 1; FIG. 2 is a circuit configuration diagram of the ion current detector of the preferred embodiment 1; and FIGS. 3A to 3D are various types of waveform diagrams in the ion current detector.

As shown in FIG. 1, the ignition system of the internal combustion engine in the preferred embodiment 1 includes an ignition plug 102 of the internal combustion engine, an ignition coil 103 which supplies a high voltage to the ignition plug 102, a controller 101 which sends an ignition command to the ignition coil 103, a bias capacitor 104 which supplies a bias voltage to the ignition plug 102, an ignition capacitor 105 which is connected to the primary side of the ignition coil 103, a DC power supply 106 which charges the ignition capacitor 105 and the bias capacitor 104 by electric power of a battery Es, a current detecting unit 107 which detects a current flowing through the ignition plug 102, an ion current detecting unit 108 which detects an ion current from a current including the ion current detected by the current detecting unit 107, and a charge limiting unit 109 which restricts a charging voltage of the bias capacitor 104. Among those, the ion current detector 100 is a portion composed of the bias capacitor 104, the ignition capacitor 105, the DC power supply 106, the current detecting unit 107, the ion current detecting unit 108, and the charge limiting unit 109, those of which are shown by a dashed line in FIG. 1.

Next, the basic operation of the ignition system and the ion current detector 100 of the internal combustion engine will be described with reference to FIG. 1 and FIG. 2.

First, voltage of the battery Es is boosted by the DC power supply 106 to charge the bias capacitor 104. This supplies a stable bias voltage Vb for detecting an ion current from a current flowing through the ignition plug 102. The bias voltage Vb is applied to a central electrode 102a of the ignition plug 102 via the ignition coil 103.

On the other hand, the ignition coil 103 generates a high voltage (secondary voltage) for generating spark discharge by an ignition command sent from the controller 101. The secondary voltage is applied to the central electrode 102a of the ignition plug 102 to generate the spark discharge between the central electrode 102a and the earthing side electrode 102b of the ignition plug 102. A combustible fuel-air mixture in a combustion chamber of the internal combustion engine is ignited by the spark discharge. This starts combustion and a combustion ion is generated associated with the combustion.

The bias voltage Vb has been already applied to the central electrode 102a of the ignition plug 102; and therefore, current flows via the combustion ion. This current is generally referred to as an ion current. In this case, the ion current flows through the earth→the bias capacitor 104→the current detecting unit 107→a secondary side winding 103b of the ignition coil 103→the ignition plug 102; and the ion current further flows to the earth via the combustion ion.

The ion current detecting unit 108 monitors a current waveform of the current flowing through the ignition plug 102, the current being detected by the current detecting unit 107; and the ion current detecting unit 108 detects main parameters such as the level of the ion current and generation/completion timing. The controller 101 determines a combustion state using the main parameters of the ion current obtained by the ion current detecting unit 108 and controls various types of actuators including the ignition coil 103 as needed.

Next, the detail operation of the preferred embodiment 1 will be described with reference to a specific circuit diagram of the ion current detector 100 shown in FIG. 2 and waveform examples (each arrow denotes a zero point) of FIGS. 3A to 3D. In this case, FIG. 3A shows a control signal waveform, FIG. 3B shows a voltage waveform to be applied to the ignition plug 102, FIG. 3C shows a current detection waveform in the case where a smolder leak is not present, and FIG. 3D shows a current detection waveform in the case where the smolder leak is present.

First, description will be made in the case of a fundamental operation in a clean state where the smolder leak is not present in the ignition plug. FIG. 2 shows an ignition device generally referred to as a direct current capacitor discharge ignition (DC-CDI) system and represents a configuration in which the DC-CDI system is combined with the ion current detecting unit.

A boosting type DC/DC converter is used as the DC power supply 106 and boosts a voltage (approximately 12 V) of the battery Es to not lower than approximately 200 to 300 V to charge the ignition capacitor 105 and the bias capacitor 104 for detecting an ion current.

Figure 3A:
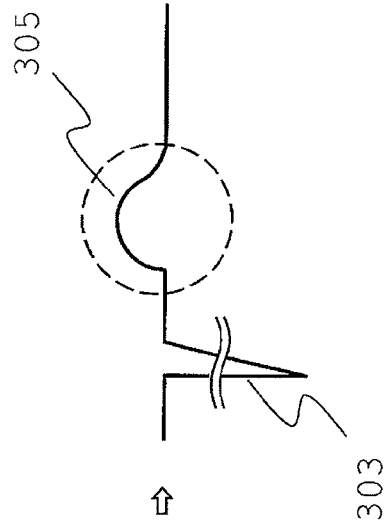
FIGS. 3A to 3D are various types of waveform diagrams in the ion current detector according to the preferred embodiment 1.
Figure 3C:
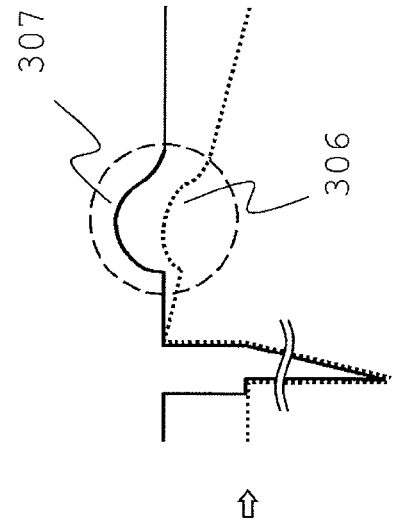
Figure 3B:
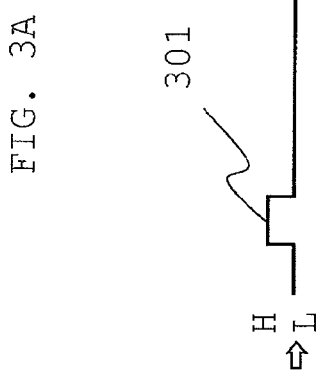
Figure 3D:
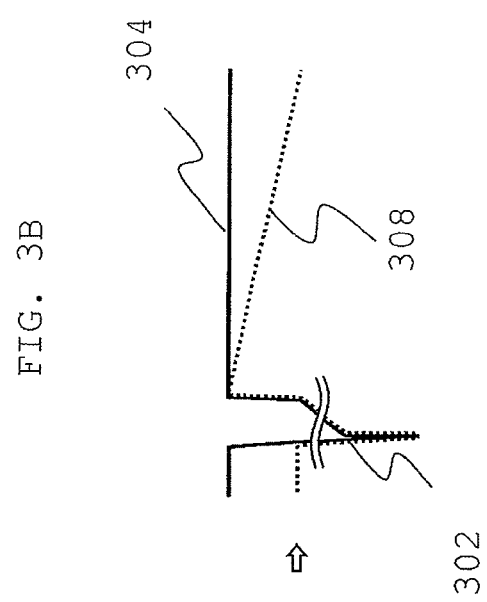

As shown in FIG. 3A, when a High ignition command signal 301 is sent from the controller 101 as a control signal, an insulated gate bipolar transistor (IGBT) 202 serving as a switch becomes an ON state and a primary current flows from the ignition capacitor 105 to the earth via a primary side winding 103a of the ignition coil 103. When the current begins to flow through the primary side winding 103a, high voltage induced electromotive force 302 (solid line) shown in FIG. 3B is generated in the secondary side winding 103b of the ignition coil 103 that is in a magnetically coupled state because the number of windings of the secondary side winding 103b is larger than that of the primary side winding 103a; and a dielectric breakdown is caused between the central electrode 102a and the earthing side electrode 102b of the ignition plug 102. This causes a secondary current 303 shown in FIG. 3C to flow through the secondary side winding 103b of the ignition coil 103 by way of the earthing side electrode 102b of the ignition plug 102→the central electrode 102a of the ignition plug 102→the secondary side winding 103b of the ignition coil 103→a Zener diode 203→a Zener diode 204→the earth.

Each voltage across the respective capacitor ends of the ignition capacitor 105 and the bias capacitor 104 is always monitored, and if both voltages reach a predetermined target charging voltage, the boost of the battery Es by the DC/DC converter 106 is stopped. The target charging voltage of the bias capacitor 104 and that of the ignition capacitor 105 are set to be the same value, and a breakdown voltage of the Zener diode 204 is set to be the same or more than the target charging voltage of the bias capacitor 104. Ideally, the breakdown voltage of the Zener diode 204 is preferably set to be the same value as the target charging voltage of the bias capacitor 104; however, realistically, the breakdown voltage of the Zener diode 204 is set to be slightly higher in consideration of variations in the characteristics of the bias capacitor 104. This is because that there is a case where if the breakdown voltage of the Zener diode 204 is lower than the charging voltage of the bias capacitor 104, the boost cannot be stopped. For example, the target charging voltage is set to 200 V and the breakdown voltage is set to 210 V. The breakdown voltage of the Zener diode 204 serves as the charge limiting unit 109 which restricts the charging voltage of the bias capacitor 104.

Alternatively, if only the target charging voltage of the ignition capacitor 105 is set and the voltage across the ignition capacitor 105 reaches the target value, even if the boost of the battery Es by the DC/DC converter 106 is stopped, substantially similar effects can be obtained. This is because it is considered that, actually, an increase or decrease in energy of the ignition capacitor 105 is more predominantly larger and capacitance of the ignition capacitor 105 is also generally set to be larger than the bias capacitor 104; and therefore, if the ignition capacitor 105 satisfies the target charging voltage, the bias capacitor 104 also satisfies the target charging voltage. Furthermore, the bias capacitor 104 is maintained in a state near full charge by the DC/DC converter 106; and therefore, the secondary current 303 flowing through the secondary side winding 103b of the ignition coil 103 shown in FIG. 3C hardly flows through the bias capacitor 104. Thus, energy loss of the spark discharge hardly generates, the consumption of unnecessary electric power can be suppressed, and the deterioration of ignition properties can be suppressed.

On the other hand, the bias voltage Vb by the bias capacitor 104 in which charging has been completed is applied to the ignition plug 102 via the current detecting resistor 107 and the secondary side winding 103b of the ignition coil 103, that is, as shown in FIG. 3B, approximately 200 V is always applied to the central electrode 102a of the ignition plug 102 as the bias voltage Vb; and accordingly, a plug voltage 304 to be applied to the ignition plug 102 is maintained at a constant value. Therefore, if a combustion ion due to ignition and combustion of the fuel-air mixture caused by the spark discharge is present near the central electrode 102a of the ignition plug 102, the combustion ion serves as a medium and accordingly, as shown in FIG. 3C, an ion current 305 flows through the secondary side winding 103b of the ignition coil 103 by way of the earth→the bias capacitor 104→the current detecting resistor 107→the secondary side winding 103b of the ignition coil 103→the central electrode 102a of the ignition plug 102→the earthing side electrode 102b.

As a result, a potential difference between both terminals of the current detecting resistor 107 is monitored by the ion current detecting unit 108; and accordingly, it is possible to get a grasp of what sort of the ion current 305 flows. In this regard, however, during the time when a high voltage is generated by induction of the ignition coil 103, the high voltage of opposite polarity negates the bias voltage Vb; and therefore, the ion current 305 cannot be substantially detected. For this reason, as the ion current detecting unit 108, the preferred embodiment 1 copes by using a differential amplifier corresponding to high common mode voltage as shown in FIG. 2.

Incidentally, as the configuration of the ion current detector 100, it is preferable that those surrounded by a solid line shown in FIG. 2 are in the same package; alternatively, the ion current detector 100 and the controller 101 are in the same package.

Furthermore, in the ion current detector 100 shown in FIG. 2, all constituent elements except for the switch (IGBT) 202 can be used in common for a plurality of cylinders by a single circuit. That is, an ion current generated in the plurality of cylinders can be detected by one circuit of the differential amplifier of the ion current detecting unit 108. In the case where a leakage current caused by a smolder to be described later is generated, it is difficult to specify a cylinder in which the leakage current is generated; however, the ion current of the plurality of cylinders can be confirmed by one common signal wire and thus reduction in size and reduction in cost of the ion current detector 100 can be achieved.

Next, description will be made on operation in the case where the smolder leak is present in the ignition plug 102 while comparing the conventional ion current detector (configuration in which the DC/DC converter 106 of the DC power supply connected to the bias capacitor 104 is not present in the ion current detector 100 of the preferred embodiment 1 described in FIG. 2) with the ion current detector 100 according to the preferred embodiment 1 of the present invention.

In the conventional ion current detector, in the case where the smolder leak is present, a voltage 308 to be applied to the central electrode 102a of the ignition plug 102 is as shown by a dashed line in FIG. 3B. The bias capacitor 104 is only charged by the secondary current flowing through the secondary side winding 103b of the ignition coil 103; and therefore, energy continues to flow out from the path of the smolder leak after the completion of the ignition. Thus, the voltage 308 to be applied to the ignition plug 102 follows only one track of lowering as shown in FIG. 3B.

At this time, a current waveform detected by the current detecting resistor 107 is as shown by a dashed line in FIG. 3D. This is because that the leakage current flows from the path of the smolder leak. As described before, the current simply attenuates associated with the lowering of the bias voltage Vb. An ion current 306 as shown in FIG. 3D is superimposed on the current waveform. However, the bias voltage Vb also lowers; and therefore, the waveform of the superimposed ion current 306 is smaller as compared to the waveform of the ion current 305 in the case where the leakage current caused by the smolder is not present and the waveform is like a crushed shape. In such a state, by the occurrence of the leakage current caused by the smolder, it becomes difficult to extract the ion current waveform from the current waveform detected by the current detecting resistor 107 and it becomes difficult to assess generation timing, completion timing, or the like of the ion current; and therefore, a problem exists in that such difficulties influence the determination of the combustion state or the like of the internal combustion engine that utilizes the ion current.

In the ion current detector 100 of the preferred embodiment 1 of the present invention, the bias capacitor 104 is charged by the DC/DC converter 106 of the DC power supply; and therefore, the current waveform detected by the current detecting resistor 107 has not a change as shown by a solid line in FIG. 3D. As in the conventional ion current detector, the leakage current caused by the smolder flows; however, the DC/DC converter 106 is connected and accordingly the bias capacitor 104 is always in a full charge state. Therefore, the bias voltage Vb does not lower as in the conventional ion current detector, the current detected by the current detecting resistor 107 becomes a constant value, and an ion current 307 is superimposed on this as shown in FIG. 3D. The lowering of the bias voltage Vb is not present; and therefore, the waveform of the ion current 307 becomes a similar current waveform to the waveform of the ion current 305 in the case where the smolder leak is not present.

Accordingly, the bias capacitor 104 is charged by the DC/DC converter 106; and therefore, even in a state where the smolder leak is present, the current waveform detected by the current detecting resistor 107 can be the same sort of a waveform change whose base is offset by a constant value. Thus, there is little effect on accuracy which assesses the generation timing, completion timing, or the like of the ion current.

As described above, according to the ion current detector in the preferred embodiment 1, there is an effect in that the DC power supply, which charges the bias capacitor that supplies the bias voltage to the ignition plug, is provided; and accordingly, even in the case where the leakage current caused by the smolder or the like of the ignition plug is present, the detection properties of the ion current due to the ion generated during combustion do not lower.

Furthermore, in the ion current detector in the preferred embodiment 1, the bias capacitor is maintained in a state near full charge by the DC power supply; and therefore, the secondary current flowing through the secondary side winding of the ignition coil hardly flows to the bias capacitor. Thus, there is also an effect that energy loss of the spark discharge hardly generates, the consumption of unnecessary electric power can be suppressed, and the deterioration of ignition properties can be suppressed.

In addition, in FIG. 2, the description has been made on the case where the DC power supplies, which charge the bias capacitor and the ignition capacitor respectively, are provided; however, similar effects can be exhibited even when these capacitors are charged by one DC power supply.

Besides, the same reference numerals as those in the drawings represent the same or corresponding elements.

The ion current detector according to the present invention is applied to an ignition device of the internal combustion engine; and accordingly, a combustion state of an internal combustion engine mounted on an automobile, a two-wheeled vehicle, an outboard motor, other special machine, and the like can be correctly monitored; and therefore, it becomes possible to efficiently operate the internal combustion engine and it is useful for fossil fuel depletion problem and environmental conservation.

100 Ion current detector
101 Controller
102 Ignition plug
103 Ignition coil
104 Bias capacitor
105 Ignition capacitor
106 DC power supply (DC/DC converter)
107 Current detecting unit (Current detecting resistor)
108 Ion current detecting unit (Differential amplifier)
109 Charge limiting unit
204 Zener diode
Es Battery

What is claimed is:

1. An ion current detector comprising:
a bias capacitor which supplies a bias voltage to an ignition plug of an internal combustion engine;
a DC power supply having a first connection located on a secondary side of an ignition coil which charges said bias capacitor;
an ion current detecting unit located on the secondary side of the ignition coil which detects an ion current included in a current flowing through said ignition plug; and
an ignition capacitor on the primary side of the ignition coil which supplies a high voltage to said ignition plug, wherein
said ignition capacitor is charged by said DC power supply at a second connection located on the primary side of the ignition coil.

2. The ion current detector according to claim 1,
further comprising a restriction function which restricts a charging voltage of said bias capacitor to a predetermined voltage.

3. The ion current detector according to claim 1,
wherein said ion current detecting unit and said DC power supply are arranged in a same package.

4. The ion current detector according to claim 1,
wherein said ion current detecting unit, said ignition capacitor, and said DC power supply are arranged in a same package.

5. A method for detecting an ion current at an ion current detector comprising:
supplying a bias voltage to an ignition plug of an internal combustion engine by a bias capacitor;
charging said bias capacitor by a DC power supply having a connection located on a secondary side of an ignition coil;
detecting an ion current included in a current flowing through said ignition plug at a secondary side of the ignition coil;
supplying a high voltage to said ignition plug by an ignition capacitor on the primary side of the ignition coil; and
charging the ignition capacitor at a the primary side of the ignition coil by the DC power supply.

6. The method according to claim 5, further comprising
restricting a charging voltage of said bias capacitor to a predetermined voltage.

7. The method according to claim 5, further comprising
arranging said ion current detector and said DC power supply in a same package.

8. The method according to claim 5,
arranging said ion current detector, said ignition capacitor, and said DC power supply in a same package.

* * * * *